United States Patent [19]
Hirn et al.

[11] 3,774,640
[45] Nov. 27, 1973

[54] BALL VALVE

[75] Inventors: Helmut Hirn, Dusslingen/Wurtt.; Wolfgang Bott, Mossingen-Belsen, both of Germany

[73] Assignee: RILCO Maschinenfabrik GmbH & Co., KG ( Dusslingen/Wurtt., Germany

[22] Filed: Oct. 25, 1972

[21] Appl. No.: 300,464

[63] Continuation-in-part of Ser. No. 46,639, June 16, 1970, abandoned.

[30] Foreign Application Priority Data
June 23, 1969 Germany.................. P 19 31 837.7
Oct. 31, 1969 Germany.................. P 19 54 994.1
Feb. 2, 1970 Germany.................. P 20 04 567.4
Feb. 24, 1970 Germany.................. P 20 08 580.7

[52] U.S. Cl. ....... 137/625.48, 137/829, 235/201 ME
[51] Int. Cl. ............................................. F15c 3/06
[58] Field of Search ................ 137/625.48, 625.41, 137/625.5, 829, 830, 832, 804; 235/201 ME

[56] References Cited
UNITED STATES PATENTS
2,560,841 7/1951 Bishop .......................... 137/625.48
3,168,898 2/1965 Samet .......................... 235/201 ME
3,318,329 5/1967 Norwood ..................... 235/201 ME
3,422,259 1/1969 Freeman ...................... 235/201 ME
3,469,456 9/1969 Riordan et al. ............... 235/201 ME
3,504,692 4/1970 Goldstein .................... 235/201 ME
3,519,013 7/1970 Amos .......................... 235/201 ME
3,575,209 4/1971 Kast ............................ 137/804
3,631,879 1/1972 Larson ........................ 235/201 ME

*Primary Examiner*—Samuel Scott
*Attorney*—Kurt Kelman et al.

[57] ABSTRACT

A ball valve in which a spherical valve member is guided toward and away from sealing engagement with a valve seat by a cylindrical sleeve insert of fractionally greater diameter. The insert floats radially and axially in the valve casing for automatic alignment with the seated valve member and for preventing leakage between the power circuit of the valve and its hydraulic control circuit in all operating conditions without need for resilient seals.

6 Claims, 1 Drawing Figure

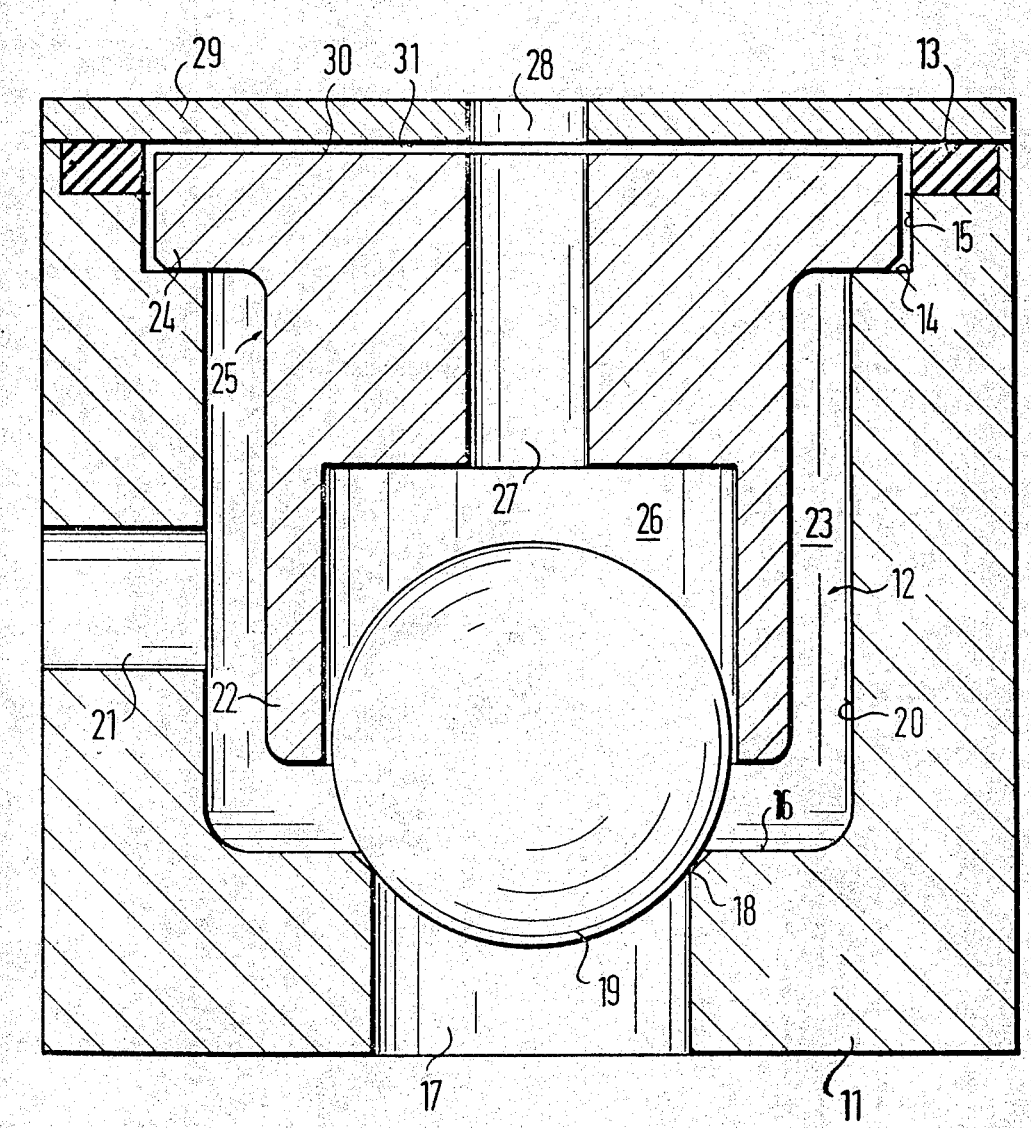

BALL VALVE

This application is a continuation-in-part of the copending application Ser. No. 46,639, filed on June 16, 1970, now abandoned.

This invention relates to fluidic control apparatus, and particularly to a ball valve suitable for use in such apparatus.

In the afore-mentioned copending application, and also in our copending application Ser. No. 300,465, filed Oct. 25, 1972, we have disclosed a ball valve which opens and closes very quickly, can be operated by small applied forces to control the flow of relatively heavy streams of liquid under high pressure, and can be built at reasonable cost.

The known valve has a casing whose cavity encloses a tubular insert. The bore of the insert has a cylindrically enlarged terminal portion and a narrower portion which constitutes a control conduit. The enlarged portion is axially open toward a face of the casing in the cavity. A discharge conduit in the cavity terminates in an orifice in that face. A spherical valve member moves in the enlarged bore portion toward and away from a position of engagement with the cavity face in which it seals the orifice of the discharge conduit. The radius of the valve member is fractionally smaller than the radius of the enlarged bore portion in the insert. The insert is secured in the casing in such a manner that the valve member and the insert define therebetween a circular gap of uniform width equal to the difference of the respective radii, when the valve member seals the orifice of the discharge conduit to permit free opening and closing movement of the valve member over a lubricating liquid film. A space radially bounded between the insert and the casing communicates with the terminal bore portion of the insert contiguously adjacent the orifice of the discharge conduit, and a supply conduit in the casing has an orifice in that space.

While the afore-described ball valve has been found effective and reliable, it had to be built with great precision to ensure the uniformity of the gap between the valve member and the inner wall of the insert. Any significant deviation from uniformity of the gap would delay the opening of the valve. Maintaining the precise dimensions and alignment of the valve parts consumes a substantial part of the cost of the known valve, modest though it is.

It has now been found that the insert aligns itself automatically with the seated spherical valve member in the necessary manner under the pressure of the liquids in the valve casing if the insert is permitted to float radially in the casing cavity within limits set by cooperating abutments on the casing and the insert, which limits include the position of concentric alignment between the insert and the seated valve member.

Other features, additional objects, and many of the attendant advantages of this invention will readily be appreciated as the same becomes better understood by reference to the following detailed description of a preferred embodiment when considered in connection with the appended drawing.

The sole FIGURE of the drawing shows a ball valve of the invention in elevational section.

The casing of the illustrated ball valve includes a valve body 11 which is formed with a bore 12 of stepped cylindrical shape, each step of the bore having a cylindrical circumferential wall and an annular radial bottom face which connects the circumferential wall with the circumferential wall of smaller diameter in the next lower step, as viewed in the drawing. The uppermost and widest step of the bore 12 is completely filled by a sealing ring 13 whose inner circumference is flush with the circumferential wall 15 of the second step. The axial height of the latter is small and not much greater than that of the ring 13.

An annular radial wall face 14 connects the wall 15 with the circumferential wall 20 of the third step which extends over more than one half of the axial length of the bore 12 to yet another annular, radial face 16. The narrowest, fourth portion 17 of the bore 12 terminates in a beveled orifice 18 in the face 16. The bore portion 17 provides a discharge conduit for the remainder of the bore hereinafter referred to as the cavity of the valve casing whose top is sealed by a cover plate 29 bolted to the valve body 11 in a conventional manner, not shown.

An insert 25 is arranged in the casing cavity. It is a generally cylindrical, unitary, tubular body of metal provided with a radial, outer flange 24 at its upper axial end. The diameter of the flange 24 is somewhat smaller than that of the circumferential wall 15, and the axial height of the flange 24 is somewhat smaller than the combined height of the wall 15 and the sealing ring 13 in the most compressed condition of the latter. The flange 24 thus can move radially relative to the axis of the insert 25 within limits set by abutting engagement of the outer flange circumference and the wall 15. The flange 24 is also free to move axially between limits set by the illustrated engagement with radial wall face 14 and engagement of the ground and honed, flat top face 30 of the insert 25 and the similarly finished bottom face 31 of the cover 29.

The bore of the insert 25 has a lower, cylindrically enlarged, axial portion 26 and a much narrower upper axial portion 27 which communicates with a central opening 28 in the casing cover 29 in all positions of the insert 25, the bore portion 27 and the opening 28 jointly forming a control conduit, as will presently be explained.

The enlarged bore portion 26 receives a spherical valve member 19 with a radial clearance which is but a small fraction of the radius of the ball-shaped member 19, but permits free axial movement of the member 19 toward and away from the illustrated position in which the member 19 is seated by gravity in the orifice 18 and seals the same.

The cylindrical outer wall of the insert 25 and the circumferential wall 20 radially bound an annular space 23 which is closed in an axially upward direction by the flange 24 in the illustrated condition of the apparatus. The sleeve portion 22 of the insert 25 which radially encloses the terminal bore portion 26 is relatively thin-walled and terminates axially short of the face 16 so that the space 23 and the bore portion 26 communicate with each other through an annular aperture contiguously adjacent the orifice 18. A supply conduit 21 in the valve body 11 leads to an orifice in the space 23.

As illustrated, the valve is empty of the liquid which controls the valve and of the liquid whose flow is controlled thereby, and all movable elements of the valve are shown in the respective positions which they assume under the force of gravity.

As described in more detail in the afore-mentioned copending applications, the supply conduit 21 is typically connected to a positive displacement pump, and the discharge conduit to the cylinder of a hydraulic press or other hydraulic motor. The control conduit 27 is connected through the opening 28 to a two-way valve which permits the control conduit to be vented to the sump of the pump or to be connected to the pressure conduit of the afore-mentioned pump or other source of fluid under high pressure.

When the control conduit is at high pressure, the valve member 11 is pressed against the orifice 18 of the discharge conduit 17, and the flange 24 engages the annular face 14 of the insert 25 to prevent leakage of control fluid from the control conduit 27 to the space 23 in any path other than the narrow annular gap between the valve member 19 and the insert wall 22. When the control conduit 27, 28 is vented to the atmosphere, the pressure of the process liquid quickly lifts the valve member 19 from its seat at the orifice 18 while the insert 25 is lifted until the polished faces 30, 31 engage each other and again prevent liquid flow between the space 23 and the control conduit 27, 28 through any path other than the annular gap about the valve member 19.

When pressure again is applied to the control conduit 27, 28, the illustrated condition of the apparatus is restored. During the downward movement of the valve member 19 and of the insert 25, the valve member reaches the seat in the orifice 18 while the flange 24 still floats axially between the faces 14 and 31, and the insert 25 is precisely centered relative to the seated valve member 19 by the control liquid entering the bore portion 26 and leaking in small amounts through the gap between the valve member and the sleeve portion 22.

The nipples, threads or other connecting devices which permit external pipes or pressure hoses to be connected to the conduits 17, 21, 28 and the valves normally provided in such pipes or hoses and partly described above have been omitted from the drawing for the sake of clarity and simplicity.

As compared to the valve disclosed in our earlier applications, the structural elements of the instant valve can be machined and assembled to less rigorous dimensional tolerances without impairing its function. Actually, the annular gap between the valve member 19 and the sleeve portion 22 can be made narrower than was possible heretofore because proper, concentric alignment of the spherical and cylindrical surfaces is achieved automatically. The speed with which the valve member 19 enters and leaves the illustrated sealing position is inversely related to the radial width of the gap. The modified valves of our present invention open and close even faster than the similar devices of our earlier inventions.

Additionally, the new valve avoids the use of resilient sealing rings other than the ring 13 which does not affect critical dimensional relationships of the apparatus.

The shape and dimensions of the opening which connects the space 23 with the enlarged bore portion 26 in the insert 25 may be chosen freely to offer sufficiently small resistance to the flow of liquid under pressure through the valve casing 11, 29. The illustrated annular opening is simple to provide and has a large effective flow section. For obvious reasons, the lower edge of the sleeve portion 22 must be located at or below the narrowest gap between the seated valve member 19 and the sleeve portion 22 if excessive leakage of fluid past the valve member 19 is to be avoided in all positions of the latter. However, the sleeve member 22 may approach the face 16 more closely than is shown in the drawing, and its edge need not be located entirely in a single radial plane as is shown.

Other modifications and variations of the example of the invention herein chosen for the purpose of the disclosure will readily suggest themselves to those skilled in the art, and it will be understood that, within the scope of the appended claims, this invention may be practised otherwise than as specifically disclosed.

What is claimed is:

1. A fluidic control unit comprising, in combination:
   a. a casing defining a cavity therein;
   b. a tubular insert in said cavity,
      1. the bore of said insert having a cylindrically enlarged terminal portion and a narrower portion constituting a control conduit,
      2. said enlarged portion having an axis and being open axially toward a face of said casing in said cavity,
      3. said casing being formed with a discharge conduit terminating in an orifice in said face;
   c. a spherical valve member axially movable in said enlarged portion toward and away from a position of engagement with said face in which said valve member seals said orifice,
      1. the radius of said valve member being fractionally smaller than the radius of said enlarged portion,
      2. said insert and said cavity radially bounding therebetween a space communicating with said terminal portion contiguously adjacent said face,
      3. said casing being formed with a supply conduit having an orifice in said space; and
   d. cooperating abutment means on said casing and on said insert permitting limited movement of said insert in said cavity radial relative to said axis toward and away from a position wherein said insert and said valve member bound therebetween a circular gap of uniform width when said valve member is in said position thereof.

2. A unit as set forth in claim 1, further comprising sealing means for limiting fluid flow between said space and said control conduit in said cavity to said gap.

3. A unit as set forth in claim 1, wherein said abutment means include a flange radially projecting from said insert, said casing being formed with a groove receiving said flange with a radial clearance permitting said limited movement of said insert.

4. A unit as set forth in claim 3, wherein said flange is received in said groove with an axial clearance permitting limited axial movement of said insert in said cavity, said flange axially bounding said space.

5. A unit as set forth in claim 4, wherein said insert and said casing have respective sealing faces sealingly engaging each other when said flange is moved axially by the pressure of a fluid in said space.

6. A unit as set forth in claim 5, wherein said space is annular about said axis and said insert.

* * * * *